United States Patent
Shimpuku et al.

(10) Patent No.: US 9,128,321 B2
(45) Date of Patent: Sep. 8, 2015

(54) POLARIZING PLATE AND TN-TYPE LIQUID CRYSTAL DISPLAY INCLUDING THE SAME

(75) Inventors: Chie Shimpuku, Kanagawa (JP); Rikio Inoue, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 398 days.

(21) Appl. No.: 13/541,324

(22) Filed: Jul. 3, 2012

(65) Prior Publication Data

US 2013/0021563 A1 Jan. 24, 2013

(30) Foreign Application Priority Data

Jul. 21, 2011 (JP) ................. 2011-159756

(51) Int. Cl.
*G02F 1/1335* (2006.01)
*G02B 5/30* (2006.01)
*G02F 1/13363* (2006.01)
*G02B 1/10* (2015.01)

(52) U.S. Cl.
CPC ........ *G02F 1/133528* (2013.01); *G02B 5/3033* (2013.01); *G02B 5/3083* (2013.01); *G02F 1/13363* (2013.01); *G02B 1/105* (2013.01); *G02F 2001/133531* (2013.01); *G02F 2201/54* (2013.01); *G02F 2203/60* (2013.01); *G02F 2413/08* (2013.01)

(58) Field of Classification Search
None
See application file for complete search history.

(56) References Cited

U.S. PATENT DOCUMENTS

| 7,388,637 B2 * | 6/2008 | Kawamoto et al. ........... 349/123 |
| 7,704,570 B2 | 4/2010 | Takebe et al. |
| 2007/0046865 A1 * | 3/2007 | Umeda et al. .................. 349/96 |
| 2007/0048459 A1 | 3/2007 | Takebe et al. |
| 2011/0043733 A1 * | 2/2011 | Suzuki et al. .................. 349/96 |

FOREIGN PATENT DOCUMENTS

| CN | 101253429 A | 8/2008 |
| JP | 2006-243132 A | 9/2006 |
| JP | 2008107499 A | 5/2008 |

OTHER PUBLICATIONS

First Office Action issued by the State Intellectual Property Office of the People's Republic of China (SIPO) issued on Mar. 26, 2014, in connection with CN201210252085.3.

* cited by examiner

*Primary Examiner* — Richard Kim
(74) *Attorney, Agent, or Firm* — Jean C. Edwards, Esq.; Edwards Neils PLLC (57) ABSTRACT

The object of the present invention is to reduce the occurrence of the light leaks from the periphery of the display flame at the originally black display time in high-temperature environments. Disclosed is a polarizing plate comprising a polarizer, a protective film on a side of the polarizer and a retardation film on the other side of the polarizer; wherein the polarizer has an absorption axis at 45° from any one of the long and short sides of the polarizing plate, the retardation film has an in-plane slow axis parallel or orthogonal to the absorption axis of the polarizer, and a difference $\Delta\epsilon'_{abs}$ in a dimensional change between the polarizing plate and the retardation film in the absorption axis direction of the polarizer satisfies the formula: $|\Delta\epsilon'_{abs}| \leq 0.10\%$.

11 Claims, 1 Drawing Sheet

POLARIZING PLATE AND TN-TYPE LIQUID CRYSTAL DISPLAY INCLUDING THE SAME

CROSS-REFERENCE TO RELATED APPLICATIONS

The present application claims the benefit of priority from Japanese Patent Application No. 159756/2011, filed on Jul. 21, 2011, the contents of which are herein incorporated by reference in their entirety.

BACKGROUND OF THE PRESENT INVENTION

1. Field of the Present Invention

The present invention relates to a polarizing plate useful for liquid crystal displays, especially, TN-type liquid crystal displays, and relates to a TN-type liquid crystal display including the polarizing plate. In particular, the present invention relates to a technique which reduces the occurrence of light leaks from the periphery of the display flame at the originally black display time in liquid crystal displays in high-temperature environments.

2. Description of the Related Art

Various types of liquid crystal displays, such as twisted nematic (TN)-type, vertical alignment (VA)-type, and in-place-switching (IPS)-type liquid crystal displays, have been widely used in monitors of personal computers (PCs) and television sets. In order to provide a wide view angle in each type, techniques have been proposed, which uses retardation films having various optical characteristics as view angle compensation films.

In general, a polarizing plate used in liquid crystal displays includes a polarizer having a light-polarizing function, a protective film attached to one side of the polarizer with an adhesive layer therebetween, and a retardation film (or a protective film in some cases) attached to the other side of the polarizer. Polyvinyl alcohol (hereinafter also referred to as PVA) is mainly used as a material of the polarizer. The polarizer is formed by uniaxially stretching a PVA film and then dyeing the stretched PVA film with iodine or dichroic dye, or dyeing a PVA film and then stretching the dyed PVA film; and cross-linking the resulting PVA film with a boron compound.

A material mainly used for the protective film is cellulose triacetate (hereinafter also referred to as TAC), which has the following advantages: high optical transparency, small birefringence, high surface smoothness, and high adhesion to polarizers of a saponified PVA.

A known cellulose acylate retardation film is prepared, for example, by laminating a cellulose acylate substrate and an optically anisotropic layer composed of a liquid crystal composition, or by stretching a cellulose acylate film. Other retardation films composed of norbornene resins or polycarbonate resins have also been variously proposed, in addition to the cellulose acylate films.

Improvements in display quality have been demanded with the spread of liquid crystal displays. Expanding applications have generated further demands for durability under severe conditions such as high temperature and high humidity. It is known that liquid crystal displays used for long time under severe conditions suffer from brightness unevenness appearing at black display sites on a screen due to light leakage. A solution to this problem has been strongly needed. Moisture absorption with time causes the contraction of the polarizer, resulting in deformation of the protective film and cells. The deformed protective film and cells cause stress to be applied to any of the components used, which generates phase difference. It is believed that this phase difference leads to the brightness unevenness, and the moisture absorption through the polarizing plate therefore is required to be reduced for the solution to such a problem. For example, JP-A2008-107499 discloses a polarizing plate which includes a protective film having a moisture permeability lower than a predetermined level and discloses a technique to suppress the dimensional change of the polarizing plate.

SUMMARY OF THE PRESENT INVENTION

In high-temperature environments, brightness unevenness, in particular light leaks from the periphery of the display flame at the originally black display time, may occur at black display sites on screens of small liquid crystal displays including TN-type liquid crystal, such as a vehicle navigation system, due to light leakage. Any solution to the brightness unevenness is needed. Brightness unevenness also occurs at black display sites on screens of VA-type or IPS-type liquid crystal displays due to light leakage. This brightness unevenness occurs at the corners of the liquid crystal displays and appears in a manner different from that in the TN-type liquid crystal displays. Furthermore, the brightness unevenness appearing at the corners of the VA-type or IPS-type liquid crystal displays cannot be substantially visually recognized in small liquid crystal displays. The light leaks from the periphery of the display flame at the originally black display time is therefore substantially inherent in small TN-type liquid crystal displays.

It is an object of the present invention to reduce the occurrence of the light leaks from the periphery of the display flame at the originally black display time in a TN-type liquid crystal display in high-temperature environments.

More specifically, it is an object of the present invention to provide a polarizing plate helpful to reduce the occurrence of the light leaks from the periphery of the display flame at the originally black display time in TN-type liquid crystal displays in high-temperature environments and to provide a TN-type liquid crystal display including the polarizing plate.

The present invention can effectively reduce the occurrence of the light leaks from the periphery of the display flame at the originally black display time in TN-type liquid crystal displays in high-temperature environments.

The means to solve the above problem are as follows;

[1] A polarizing plate comprising a polarizer, a protective film on a side of the polarizer and a retardation film on the other side of the polarizer;

wherein the polarizer has an absorption axis at 45° from any one of the long and short sides of the polarizing plate, the retardation film has an in-plane slow axis parallel or orthogonal to the absorption axis of the polarizer, and a difference $\Delta\epsilon'_{abs}$ in a dimensional change between the polarizing plate and the retardation film in the absorption axis direction of the polarizer satisfies the formula:

$$|\Delta\epsilon'_{abs}| \leq 0.10\%,$$

where $\Delta\epsilon'_{abs}(\%)$ is a percent difference in dimensional change in the absorption axis direction at 25° C. and 60% RH between a percent change $\text{Pol}\Delta\epsilon_{abs}(\%)$ of the length of the polarizing plate after being dried at 60° C. for 100 hours to the initial length of the polarizing plate and a percent change $\text{Ret}\Delta\epsilon_{abs}(\%)$ of the length of the retardation film after being dried at 60° C. for 100 hours to the initial length of the retardation film alone.

[2] The polarizing plate according to [1], wherein a tensile modulus $PE_{abs}$ of the protective film in the absorption axis direction of the polarizer satisfies the formula:

$$PE_{abs} \geq 4.0 \text{ GPa, and}$$

a tensile modulus $RE_{abs}$ of the retardation film in the absorption axis direction of the polarizer satisfies the formula:

$$RE_{abs} \leq 3.8 \text{ GPa}.$$

[3] The polarizing plate according to [1], wherein the polarizer has a thickness of 30 μm or less.

[4] The polarizing plate according to [2], wherein the polarizer has a thickness of 30 μm or less.

[5] The polarizing plate according to [1], wherein the retardation film comprises cellulose acylate having an acetyl group and an acyl group other than the acetyl group.

[6] The polarizing plate according to [2], wherein the retardation film comprises cellulose acylate having an acetyl group and an acyl group other than the acetyl group.

[7] The polarizing plate according to [3], wherein the retardation film comprises cellulose acylate having an acetyl group and an acyl group other than the acetyl group.

[8] The polarizing plate according to [4], wherein the retardation film comprises cellulose acylate having an acetyl group and an acyl group other than the acetyl group.

[9] The polarizing plate according to [1], wherein the retardation film comprises at least one plasticizer selected from the group consisting of a polycondensed ester plasticizer and a carbohydrate plasticizer.

[10] The polarizing plate according to [2], wherein the retardation film comprises at least one plasticizer selected from the group consisting of a polycondensed ester plasticizer and a carbohydrate plasticizer.

[11] The polarizing plate according to [3], wherein the retardation film comprises at least one plasticizer selected from the group consisting of a polycondensed ester plasticizer and a carbohydrate plasticizer.

[12] The polarizing plate according to [4], wherein the retardation film comprises at least one plasticizer selected from the group consisting of a polycondensed ester plasticizer and a carbohydrate plasticizer.

[13] The polarizing plate according to [5], wherein the retardation film comprises at least one plasticizer selected from the group consisting of a polycondensed ester plasticizer and a carbohydrate plasticizer.

[14] The polarizing plate according to [6], wherein the retardation film comprises at least one plasticizer selected from the group consisting of a polycondensed ester plasticizer and a carbohydrate plasticizer.

[15] The polarizing plate according to [7], wherein the retardation film comprises at least one plasticizer selected from the group consisting of a polycondensed ester plasticizer and a carbohydrate plasticizer.

[16] The polarizing plate according to [8], wherein the retardation film comprises at least one plasticizer selected from the group consisting of a polycondensed ester plasticizer and a carbohydrate plasticizer.

[17] A TN-type liquid crystal display comprising the polarizing plate according to any one of [1] to [16].

BEST MODE FOR CARRYING OUT THE INVENTION

The invention is described in detail hereinunder. Note that, in this patent specification, any numerical expressions in a style of " . . . to . . . " will be used to indicate a range including the lower and upper limits represented by the numerals given before and after "to", respectively.

In this description, $Re(\lambda)$ and $Rth(\lambda)$ are retardation (nm) in plane and retardation (nm) along the thickness direction, respectively, at a wavelength of $\lambda$. $Re(\lambda)$ is measured by applying light having a wavelength of $\lambda$ nm to a film in the normal direction of the film, using KOBRA 21ADH or WR (by Oji Scientific Instruments). The selection of the measurement wavelength may be conducted according to the manual-exchange of the wavelength-selective-filter or according to the exchange of the measurement value by the program.

When a film to be analyzed is expressed by a monoaxial or biaxial index ellipsoid, $Rth(\lambda)$ of the film is calculated as follows.

$Rth(\lambda)$ is calculated by KOBRA 21ADH or WR on the basis of the six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane), a value of hypothetical mean refractive index, and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the $Rth(\lambda)$ of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to formulae (A) and (B):

$$Re(\theta) = \left[ nx - \frac{nx \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \quad (A)$$

$Re(\theta)$ represents a retardation value in the direction inclined by an angle $\theta$ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the film.

$$Rth = \{(nx+ny)/2 - nz\} \times d \quad (B):$$

In the formula, nx represents a refractive index in the in-plane slow axis direction; ny represents a refractive index in the in-plane direction perpendicular to nx; and nz represents a refractive index in the direction perpendicular to nx and ny. And "d" is a thickness of the film.

When the film to be analyzed is not expressed by a mono-axial or biaxial index ellipsoid, or that is, when the film does not have an optical axis, then Rth ($\lambda$) of the film may be calculated as follows:

Re(λ) of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of λ nm applied in the inclined direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main optical films are listed below:

cellulose acylate (1.48), cycloolefin polymer (1.52), polycarbonate (1.59), polymethylmethacrylate (1.49) and polystyrene (1.59). KOBRA 21ADH or WR calculates nx, ny and nz, upon enter of the hypothetical values of these mean refractive indices and the film thickness. On the basis of thus-calculated nx, ny and nz, Nz=(nx−nz)/(nx−ny) is further calculated.

In the specification, the angle desirably falls within a range of an exact angle±an angle less than 10°, more desirably within a range of an exact angle±5°, or even more desirably within a range of an exact angle±3°.

In the description, the wavelength of measurement of Re and Rth is 550 nm as far as there is no specific notation.

The present invention relates to a polarizing plate including a polarizer including a protective film on a side thereof and a retardation film on the other side thereof. The long or short side of the polarizing plate and the absorption axis of the polarizer define an angle of 45°. The in-plane slow axis of the retardation film is parallel or orthogonal to the absorption axis of the polarizer. Assuming that the difference in a dimensional change between the polarizing plate and the retardation film in the absorption axis direction of the polarizer is $\Delta\epsilon_{abs}$, the polarizing plate satisfies the formula:

$$|\Delta\epsilon'_{abs}| \le 0.10\%.$$

The inventor has conducted extensive studies and found that it is important to reduce the stress applied to a retardation film of a polarizing plate disposed in a liquid crystal display in high-temperature atmospheres for solving the problems described above. The stress results from a difference in the dimensional change between the entire polarizing plate and the retardation film alone in high-temperature environments. The inventor has therefore found that a reduction in the difference in the dimensional change can lead to a decrease in the stress applied to the retardation film. However, it is difficult to reduce the difference in the dimensional change between the entire polarizing plate and the retardation film alone to substantial zero in a direction in which polyvinyl alcohol constituting the polarizer exhibits large contraction (direction orthogonal to the absorption axis of the polarizer). In contrast, the difference in the dimensional change between the polarizing plate and the retardation film can be reduced to substantial zero in the direction in which the polarizer exhibits small contraction (absorption axis direction of the polarizer). Hence, in the present invention, the absorption axis direction of the polarizing plate is distinguished from the direction orthogonal to the absorption axis direction, and only the stress component along the direction parallel to the absorption axis is reduced among the total stress caused by the contraction of the polarizing plate in high-temperature atmospheres. This can effectively reduce stress applied to the retardation film and thus reduce the occurrence of the light leaks from the periphery of the display flame at the originally black display time.

The difference in dimensional change $\Delta\epsilon'_{abs}$ is a difference in percentage between the dimensional change of the entire polarizing plate in the absorption axis direction and the dimensional change of the retardation film alone in the same direction. The difference in dimensional change $\Delta\epsilon'_{abs}$ will now be described in detail.

The difference in the dimensional change in the direction parallel to the absorption axis of the polarizer can be reduced by any one or combination of the following techniques (a) to (c):

(a) The elastic modulus of the protective film is increased to suppress the contraction of the polarizer;
(b) The elastic modulus of the retardation film is reduced to follow the contraction of the polarizer; and
(c) The thickness of the polarizer is reduced to decrease the contribution of the polarizer to the dimensional change.

The details of these techniques will be described later.

The components included in the polarizing plate of the present invention will now be described.

Retardation Film

The retardation film can be composed of any material. For instance, the retardation film may be a cellulose acylate film primarily composed of cellulose acylate. Although the cellulose acylate film is described below as an example, the present invention should not be limited to this example.

Cellulose Acylate Film

A preferred cellulose acylate film which can be used as a retardation film primarily contains cellulose acylate in which hydroxyl groups of the glucose units contained in the cellulose acylate are replaced with acyl groups in a total substitution degree of 2.2 to 2.6. A more preferred cellulose acylate film primarily contains cellulose acetate propionate which satisfies formulae (1) and (2).

$$2.2 \le A+B \le 2.6 \qquad \text{Formula (1)}$$

$$0.3 \le B \le 1.2 \qquad \text{Formula (2)}$$

In Formula (1) and (2), A represents the substitution degree of acetyl groups contained in the cellulose acylate, and B represents the substitution degree of propionyl groups contained in the cellulose acylate.

If only one type of cellulose acylate is used as a material of the film, the term "primarily contain" herein refers to one cellulose acylate component. If two or more types of cellulose acylate are used, the term refers to cellulose acylate of the highest content. The glucose units contained in cellulose and having a β-1,4 bond have free hydroxyl groups in its 2-, 3- and 6-positions. In cellulose acetate propionate used in the present invention, hydrogen atoms of these three hydroxyl groups are replaced with acetyl groups or propionyl groups in a substitution degree of 2.2 to 2.6 on average, and the substitution degree of the hydrogen atoms replaced with the propionyl groups is in the range of 0.6 to 1.1.

The substitution degree of the acetyl groups and propionyl groups contained in cellulose acylate can be determined through measurement of linked fatty acid per mass of the cellulose structural units. The measurement can be carried out in accordance with ASTM-D817-91.

Examples of cellulose used as a starting material in preparation of cellulose acetate propionate include cotton linter and wood pulp (broadleaf pulp and coniferous pulp). Any cellulose acylate obtained from any of such starting cellulose may be used. Different types of cellulose acylate may also be used in combination in some cases. The details of the cellulose as a starting material are described, for example, in "Plastic Zairyo Kouza (17), Cellulosic Resin" (written by Marusawa and Uda, published by Nikkan Kogyo Shimbun Ltd., 1970); and Hatsumei Kyokai Disclosure Bulletin 2001-1745 (pp. 7-8). Any cellulose can be used for cellulose acetate propionate without limitation.

The cellulose acetate propionate has a weight average degree of polymerization preferably in the range of 350 to 800, more preferably 370 to 600. The cellulose acetate propionate used in the present invention has a number average molecular weight preferably in the range of 70000 to 230000, more preferably 75000 to 230000, and further preferably 78000 to 120000.

The cellulose acetate propionate can be synthesized from acylating agents such as acid anhydride and acid chloride. The most common industrial synthetic process for intended cellulose acetate propionate involves esterification of cellulose obtained from cotton linter or wood pulp with a mixed organic acid component containing organic acids corresponding to acetyl groups and propionyl groups (acetic acid and propionic acid) or acid anhydrides thereof (acetic anhydride and propionic anhydride).

Additives

The retardation film used in the present invention may optionally contain at least one additive in addition to the primary component such as cellulose acylate, depending on the intended use. In the case of producing the retardation film by a solvent-casting method, the additive can be incorporated during a doping process. The additive may be added at an appropriate time. The additive is selected from materials compatible with the primary component such as cellulose acetate propionate (soluble during the doping process of cellulose acetate propionate in the solvent casting method). The additive is incorporated to control optical and other characteristics of the primary component such as cellulose acetate propionate.

Plasticizer

The retardation film preferably contains a plasticizer, which improves film formability. In view of birefringence, preferred are polycondensed ester plasticizers. The polycondensed ester plasticizers can be selected from polycondensation products of dicarboxylic acids with diols. Any polycondensed ester plasticizer can be used without restriction. Preferred are polycondensed ester plasticizers having aromatic rings in their molecules, and more preferred are polycondensed ester plasticizers having benzene rings in their molecules. Among these, the plasticizer is preferably selected from polycondensation products of aromatic dicarboxylic acids with aliphatic diols. Aromatic dicarboxylic acids and aliphatic diols may be each used alone or in combination.

Examples of the aromatic dicarboxylic acids include arylene dicarboxylic acids having 6 to 12 carbon atoms, such as phthalic acid, terephthalic acid, isophthalic acid, 1,5-naphthalene dicarboxylic acid, and 1,4-naphthalene dicarboxylic acid. In particular, polycondensed ester plasticizers being benzene derivatives composed of dicarboxylic acid components having two carboxylic acids at the para positions, such as terephthalic acid are preferred in view of high birefringence.

Examples of the aliphatic diols include alkylene glycols having 2 to 12 carbon atoms. Specific examples of such alkylene glycols include ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylol pentane), 2-n-butyl-2-ethyl-1,3-propanediol (3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, and 1,12-octadecanediol. These alkylene glycols may be used alone or in combination.

The polycondensed ester plasticizers which can be used in the present invention preferably have capped hydroxyl terminals. Aromatic monocarboxylic acids can be used for capping, and preferred are benzene monocarboxylic acids optionally having substituents. Examples of such benzene monocarboxylic acids include benzoic acid, p-tert-butylbenzoic acid, o-toluic acid, m-toluic acid, p-toluic acid, dimethylbenzoic acid, ethylbenzoic acid, n-propylbenzoic acid, aminobenzoic acid, and acetoxybenzoic acid. These benzene monocarboxylic acids may be used alone or in combination.

Although specific examples of the polycondensed ester plasticizers which can be used in the present invention are described below, the present invention should not be limited to the specific examples.

TABLE 1

| Examples of compound | Aromatic dicarboxylic acid | Aliphatic diol | Aromatic monocarboxylic acid (OH -capping agent) |
| --- | --- | --- | --- |
| E-1 | Terephthalic acid | Ethylene glycol | Benzoic acid |
| E-2 | Terephthalic acid | Ethylene glycol | p-methylbenzoic acid |
| E-3 | Terephthalic acid | 1,2-propanediol | Benzoic acid |
| E-4 | Terephthalic acid | 1,2-propanediol | p-methylbenzoic acid |
| E-5 | 1,4-naphthalene dicarboxylic acid | Ethylene glycol | Benzoic acid |
| E-6 | 1,4-naphthalene dicarboxylic acid | Ethylene glycol | p-methylbenzoic acid |
| E-7 | 1,4-naphthalene dicarboxylic acid | 1,2-propanediol | Benzoic acid |
| E-8 | 1,4-naphthalene dicarboxylic acid | 1,2-propanediol | p-methylbenzoic acid |
| E-9 | Phthalic acid | 1,2-propanediol | Benzoic acid |
| E-10 | Phthalic acid | 1,2-propanediol | p-methylbenzoic acid |

Usable polycondensed ester plasticizers have a number-average molecular weight of preferably 300 to 2000, more preferably 400 to 1500. The polycondensed ester plasticizers preferably have an acid value of 0.5 mgKOH/g or lower and a hydroxyl value of 25 mgKOH/g or lower, more preferably have an acid value of 0.3 mgKOH/g or lower and a hydroxyl value of 15 mgKOH/g or lower.

The amount of the polycondensed ester plasticizer to be added is preferably in the range of 1 to 25 mass %, more preferably in the range of 2 to 15 mass % relative to cellulose acylate. The amount of additive should not be limited to these ranges.

Examples of other preferred plasticizers which can be used in the present invention include carbohydrate plasticizers. Such plasticizers are derivatives of carbohydrates containing monosaccharides or two to ten monosaccharide units. In these monosaccharides or polysaccharides, substitutable groups which contained in their molecules (for instance, hydroxyl group, carboxyl group, amino group, and mercapto group) are preferably substituted. Examples of the substituent include an ether group, an ester group, an amide group, and an imide group.

Examples of the carbohydrates containing monosaccharides or two to ten monosaccharide units include erythrose, threose, ribose, arabinose, xylose, lyxose, arose, altrose, glucose, fructose, mannose, gulose, idose, galactose, talose, trehalose, isotrehalose, neotrehalose, trehalosamine, kojibiose, nigerose, maltose, maltitol, isomaltose, sophorose, laminaribiose, cellobiose, gentiobiose, lactose, lactosamine, lactitol, lactulose, melibiose, primeverose, rutinose, scillabiose, sucrose, sucralose, turanose, vicianose, cellotriose, chacotriose, gentianose, isomaltotriose, isopanose, maltotriose, manninotriose, melezitose, panose, planteose, raffinose, solatriose, umbelliferose, lycotetraose, maltotetraose, stachyose, baltopentaose, belbalcose, maltohexaose, α-cyclodextrin, β-cyclodextrin, γ-cyclodextrin, δ-cyclodextrin, xylitol, and sorbitol.

Preferred are ribose, arabinose, xylose, lyxose, glucose, fructose, mannose, galactose, trehalose, maltose, cellobiose, lactose, sucrose, sucralose, α-cyclodextrin, β-cyclodextrin, γ-cyclodextrin, δ-cyclodextrin, xylitol, and sorbitol; more preferred are arabinose, xylose, glucose, fructose, mannose, galactose, maltose, cellobiose, sucrose, β-cyclodextrin, and γ-cyclodextrin; and even more preferred are xylose, glucose, fructose, mannose, galactose, maltose, cellobiose, sucrose, xylitol, and sorbitol.

Examples of the substituents for the carbohydrate plasticizer include ether groups (preferably alkyl ether groups having 1 to 22 carbon atoms, more preferably 1 to 12 carbon atoms, and still more preferably 1 to 8 carbon atoms, such as methyl ether, ethyl ether, propyl ether, hydroxyethyl ether, hydroxypropyl ether, 2-cyanoethyl ether, phenyl ether, and benzyl ether), ester groups (preferably acyl ester groups having 1 to 22 carbon atoms, more preferably 2 to 12 carbon atoms, and still more preferably 2 to 8 carbon atoms, such as an acetyl group, a propionyl group, a butyryl group, a pentanoyl group, a hexanoyl group, an octanoyl group, a benzoyl group, a tolyl group, and a phthalyl group), an amido group (preferably amides having 1 to 22 carbon atoms, more preferably 2 to 12 carbon atoms, and still more preferably 2 to 8 carbon atoms, such as formamide and acetamide), and an imido group (preferably an imido group having 4 to 22 carbon atoms, more preferably 4 to 12 carbon atoms, and still more preferably 4 to 8 carbon atoms, such as succinimide and phthalimide).

Of these, preferred are an ether group and an ester group, and more preferred is an ester group.

Preferred examples of the carbohydrate plasticizer, but should not be limited to, include xylose tetraacetate, glucose pentaacetate, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabutyrate, glucose pentabutyrate, fructose pentabutyrate, mannose pentabutyrate, galactose pentabutyrate, maltose octabutyrate, cellobiose octabutyrate, sucrose octabutyrate, xylitol pentabutyrate, sorbitol hexabutyrate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate. Among these, more preferred are xylose tetraacetate, glucose pentaacetate, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate. Even more preferred are maltose octaacetate, cellobiose octaacetate, sucrose octaacetate, xylose tetrapropionate, glucose pentapropionate, fructose pentapropionate, mannose pentapropionate, galactose pentapropionate, maltose octapropionate, cellobiose octapropionate, sucrose octapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate.

The retardation film may contain any other plasticizer, for instance, at least one plasticizer selected from polyhydric alcohol ester plasticizers, saccharide plasticizers, and phosphate plasticizers. Specific examples of such plasticizers are disclosed in JP-A2010-079241 and JP-A2007-169592.

The retardation film may contain any other additive, for example, at least one additive selected from various additives such as fine particles, deterioration inhibitors, releasing agents, and agents for adjusting optical characteristics. Examples of the additives are disclosed in JP-A2010-079241 for reference.

The total content of the additives including the plasticizer is preferably 25 mass % or lower relative to the primary component such as cellulose acetate propionate.

Film Formation

The retardation film can be formed by any method without limitation. Both a liquid film forming method and a melt casting method can be used. A solvent casting method is preferred. A solvent casting method involves casting a dope onto a surface of, for example, a metallic support, the dope being prepared by dissolving predetermined cellulose acetate propionate in an organic solvent; drying the dope into a film; separating the film from the support; and optionally stretching the separated film (for instance, biaxial stretching). Various documents disclose solvent casting methods for reference. For example, JP-A2010-079241 discloses a solvent casting method in its paragraphs [0064] to [0079].

Stretching

The retardation film may be stretched to adjust its retardation function. The retardation film may be stretched during or after the formation thereof. The retardation film is stretched at normal temperature or in thermal environments. The heating temperature is preferably ±20° C. from the glass transition temperature of the retardation film. Stretching at a temperature significantly lower than the glass transition temperature causes the retardation film to be easily broken and desired optical characteristics does not exhibit. In the case of stretching the retardation film at a temperature significantly higher than the glass transition temperature, molecular orientation resulting from the stretching is relaxed by heat generated during the stretching before being thermally fixed. Thus, stable molecular orientation cannot be provided, the exhibition of optical characteristics become worse.

The retardation film may be uniaxially or biaxially stretched. In the case where the direction parallel to the absorption axis is the machine direction (MD) of the retardation film, preferred uniaxial stretching is in the transverse direction (TD) orthogonal to the MD so that tensile modulus in the direction parallel to the absorption axis is adjusted to the following preferred range. The retardation film is stretched in the TD in a draw ratio of preferably 1.1 to 2, more preferably 1.1 to 1.6.

Surface Treatment

The retardation film formed in this manner may be subjected to surface treatment. Examples of the surface treatment include corona discharge treatment, glow discharge treatment, flame treatment, acid treatment, alkali treatment, and ultraviolet irradiation treatment. In addition, an under coat is preferably provided as disclosed in JP-A7-333433. In the case of attaching the retardation film to the polarizer for protection, it is particularly preferred that the surface of the retardation film be subjected to acid or alkali treatment, namely, saponification, in view of adhesion to the polarizer. The retardation film has a surface energy of preferably 55 mN/m or higher, more preferably in the range of 60 mN/m to 75 mN/m.

Optical Characteristics

With the phase difference of the retardation film used in the present invention, preferably, the retardation in plane Re (550) at a wavelength of 550 nm is in the range of 20 to 80 nm and the retardation along the thickness direction Rth (550) at the same wavelength is in the range of 100 to 180 nm. More preferably, the Re (550) ranges from 30 to 60 nm and the Rth (550) ranges from 110 to 160 nm. These ranges enhance view angle compensation of TN-type liquid crystal cells (in particular, thin cells).

Tensile Modulus

The tensile modulus $RE_{abs}$ of the retardation film used in the present invention is preferably 3.8 GPa or lower in the direction parallel to the absorption axis of the polarizer. This enables the contraction of the retardation film to easily follow the contraction of the polarizer in the absorption axis direction in which the polarizer exhibits small contraction. More preferred is 3.6 GPa or lower, and even more preferred is 3.4 GPa or lower.

In the case where the absorption axis of the polarizer is parallel to the normal MD of the retardation film, the $RE_{abs}$ is the observed value in the MD of the retardation film.

Protective Film

Although the protective film attached to the other surface of the polarizer (the outer surface of the polarizer incorporated in the liquid crystal display) is not specifically limited, a protective film having a high elastic modulus reduces the contraction of the polarizer and is therefore preferably employed. Examples of materials used in the protective film include various polymer films such as cellulose acylate; polycarbonate polymers; polyester polymers e.g., polyethylene terephthalate and polyethylene naphthalate; acrylic polymers e.g., polymethylmethacrylate; and styrene polymers e.g., polystyrene and acrylonitrile-styrene copolymers (AS resins). The primary component for preparation of the polymer film which functions as the protective film can be at least one polymer selected from polyolefin polymers, for example, polyolefin such as polyethylene and polypropylene, cyclopolyolefin such as norbornene, and ethylene-propylene copolymers; vinyl chloride polymers; amide polymers such as nylon and aromatic polyamide; imide polymers; sulfone polymers; polyether sulfone polymers; polyether ether ketone polymers; polyphenylen sulfide polymers; vinylidene chloride polymers; vinyl alcohol polymers; vinyl butyral polymers; acrylate polymers; polyoxymethylene polymers; epoxy polymers; and polymers containing a mixture of these polymers. Preferred are cellulose acylate films, and more preferred is a cellulose triacetate film.

Tensile Modulus

The protective film used in the present invention preferably has a tensile modulus $PE_{abs}$ of 4.0 GPa or higher in the direction parallel to the absorption axis, in view of a reduction in the contraction of the protective film in the absorption axis direction in which the polarizer exhibits small contraction. The tensile modulus is more preferably in the range of 4.2 to 6.0 GPa, further preferably 4.6 to 6.0 GPa, and still further preferably 5.0 to 6.0 GPa.

In the case where the absorption axis of the polarizer is parallel to the normal transport direction of the retardation film, the $PE_{abs}$ is the measured value in the transport direction (the MD) of the retardation film.

In order to adjust the tensile modulus of the protective film in the MD to a preferred range, the protective film may be uniaxially stretched in the MD. In the case of forming the film by the solvent casting method without stretching, the tensile modulus of the non-stretched film may be adjusted to the preferred range through selection of appropriate cellulose acylate as the primary component or proper selection of the types or amounts of the additives.

Polarizer

The polarizer used in the present invention may be composed of any material without limitation. For instance, a usable material is formed by stretching a polyvinyl alcohol film in an iodine solution. Examples of adhesives used for attaching the retardation film to the polarizer include aqueous solution of polyvinyl alcohol or polyvinyl acetal (for example, polyvinyl butyral) and latex of vinyl polymers (for example, polybutyl acrylate). An especially preferred adhesive is an aqueous solution of completely saponified polyvinyl alcohol.

The polarizer has a thickness that is preferably in the range of 1 to 40 μm, more preferably 5 to 25 μm, and most preferably 5 to 20 μm, which can reduce the contraction of the polarizing plate.

Method for Producing Polarizing Plate

An example method for producing the polarizing plate involves laminating a long polarizer, a retardation film, and a protective film in the longitudinal direction thereof to form a multilayered product and cutting the multilayered product in a rectangle having each side in the direction at 45° from the longitudinal direction. Since a long polarizer normally has an absorption axis along the longitudinal direction thereof, cutting the multilayered product in the direction at 45° from the longitudinal direction can readily produce polarizing plates each having long or short sides at 45° from the absorption axis of the polarizer. Since a long film generally has an in-plane slow axis in the direction parallel or orthogonal to the longitudinal direction thereof, the retardation film also has an in-plane slow axis in the direction at 45° from the long or short sides of the polarizing plate.

Difference in Dimensional Change Between Polarizing Plate and Retardation Film

In order to reduce the difference in the dimensional change between the polarizing plate and the retardation film to substantial zero in the absorption axis direction in which the polarizer exhibits small contraction, $|\Delta\epsilon'_{abs}|$ is 0.10% or lower in the present invention. Preferred is 0.08% or lower, more preferred is 0.06% or lower, and most preferred is 0.04% or lower.

The term $\Delta\epsilon'_{abs}$(%) herein refers to a percent difference in dimensional change in the absorption axis direction at 25° C. and 60% RH between a percent change $Pol\Delta\epsilon_{abs}$(%) of the length of a polarizing plate after being dried at 60° C. for 100 hours to the initial length of the polarizing plate and a percent change $Ret\Delta\epsilon_{abs}$(%) of the length of a retardation film after being dried at 60° C. for 100 hours to the initial length of the retardation film alone.

In particular, assuming that the length of the initial polarizing plate in the absorption axis direction at 25° C. and 60% RH is $L1_{pol}$ and that the length of the polarizing plate dried at 60° C. for 100 hours in the absorption axis direction at 25° C. and 60% RH is $L2_{pol}$, the $Pol\Delta\epsilon_{abs}$ is determined from the following formula:

$$Pol\Delta\epsilon_{abs}=\{(L1_{pol}-L2_{pol})/L1_{pol}\}\times 100$$

Similarly, assuming that the length of the initial retardation film in the absorption axis direction at 25° C. and 60% RH is $L1_{ret}$ and that the length of the retardation film dried at 60° C. for 100 hours in the absorption axis direction at 25° C. and 60% RH is $L2_{ret}$, the $\text{Ret}\Delta\epsilon_{abs}$ is determined from the following formula:

$$\text{Ret}\Delta\epsilon_{abs} = \{(L1_{ret} - L2_{ret})/L1_{ret}\} \times 100$$

The term $\Delta\epsilon'_{abs}$ indicates a difference between the $\text{Pol}\Delta\epsilon_{abs}$ and $\text{Ret}\Delta\epsilon_{abs}$ determined by these formulae.

The difference in the dimensional change between the polarizing plate and the retardation film in the transmission direction in which the polarizer exhibits large contraction can be determined as in the determination of $\Delta\epsilon'_{abs}$ except for the direction in the dimensional measurement. The absolute value of the determined difference is preferably in the range of 0.2 to 1.0% and more preferably 0.3 to 0.8%, which can reduce the occurrence of the light leaks from the periphery of the display flame at the originally black display time.

The dimension of the polarizing plate in the absorption axis direction refers to the length of the entire multilayered product including the polarizer, the protective film formed on one surface thereof, and the retardation film formed on the other surface thereof in the absorption axis direction. The dimension of the retardation film in the absorption axis direction refers to the length of the retardation film alone attached to the polarizer in the direction parallel to the absorption axis direction (in general, the in-plane slow axis direction of the retardation film or the direction orthogonal thereto).

Liquid Crystal Display

The polarizing plate of the present invention can be used in liquid crystal displays and preferably used in TN-type liquid crystal displays. The liquid crystal display of the present invention has view angle characteristics suitable for displays of apparatuses for personal use with a display size of 24 inches or smaller, for example, laptop computers, tablet computes, and smartphones. In particular, the polarizer exhibits the following view angle characteristics: a polar angle at 35° (preferably 45°) or larger that provides a contrast ratio of 10 or higher in the vertical direction and a polar angle at 60° (preferably 70°) or larger that provides a contrast ratio of 10 or higher in the horizontal direction.

Figure 1:
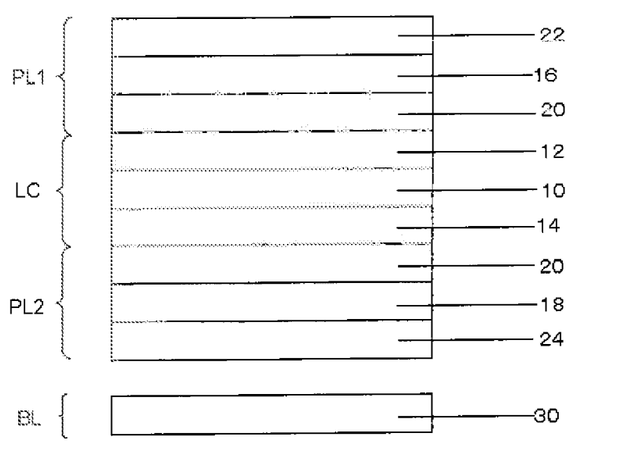
FIG. 1 is a cross-sectional view schematically illustrating a TN-type liquid crystal display of an embodiment of the present invention.

FIG. 1 is a cross-sectional view schematically illustrating an embodiment of the TN-type liquid crystal display of the present invention. In the drawing, the relative thicknesses of the individual layers do not always reflect the relative thicknesses of the individual layers of an actual liquid crystal display.

The TN-type liquid crystal display illustrated in FIG. 1 includes a pair of a view-side polarizing plate PL1 and a back-light-side polarizing plate PL2 of the present invention, a TN-type liquid crystal cell LC disposed between the polarizing plates PL1 and PL2, and a back light BL positioned at the exterior of a back-light-side polarizer 18 of the polarizing plates PL2.

A polarizer 16 of the polarizing plate PL1 and the polarizer 18 are disposed so as to have transmission axes orthogonal to each other, the transmission axes tilting by 45° or 135° from the horizontal direction (also referred to as 0° direction) of the display surface. In an example, the transmission axis of the polarizer 16 is parallel to the rubbing axis of a substrate 12 while the transmission axis of the polarizer 18 is parallel to the rubbing axis of a substrate 14. In another example, the transmission axis of the polarizer 16 is orthogonal to the rubbing axis of the substrate 12 while the transmission axis of the polarizer 18 is orthogonal to the rubbing axis of the substrate 14. The polarizing plate PL1 further includes a retardation film 20 and a protective film 22. The polarizing plate PL2 further includes a retardation film 20 and a protective film 24.

The liquid crystal cell LC includes a pair of substrates 12 and 14 and a liquid crystal layer 10 disposed therebetween and composed of a nematic liquid crystal material. Rubbed alignment films (not illustrated) are disposed between the substrates 12 and 14. The rubbed alignment films align the nematic liquid crystals in the rubbing direction thereof to form twisted alignment. The substrates 12 and 14 have inner surfaces provided with electrode layers (not illustrated). Application of voltage causes the twisted alignment of the nematic liquid crystal to be released to alignment vertical to the surfaces of the substrates. The liquid crystal cell LC may further include any other component such as a color filter.

The TN-type liquid crystal cell LC is not specifically limited, and any liquid crystal cell suitable for TN-type liquid crystal displays can be used. The mainstream of laptop computers are thin type products, and the And of a thin TN-type liquid crystal cell is generally in the range of 350 to 450 nm.

Any light source can be used for the back light BL of back light unit 30. Components which can control the directivity of light, such as a prism sheet and a diffusion film, can be used for adjustment of the back light BL.

Examples

The invention is further explained Paragraphs below will further specifically describe features of the present invention, referring to Examples and Comparative Examples. Any materials, amount of use, ratio, details of processing, procedures of processing and so forth shown in Examples may appropriately be modified without departing from the spirit of the present invention. Therefore, it is to be understood that the scope of the present invention should not be interpreted in a limited manner based on the specific examples shown below.

Production of Retardation Film A

A retardation film was produced under the stretching conditions shown in Table 2 using cellulose acylate with the substitution degree shown in Table 2 and additives.

Preparation of Fine Particle Dispersion

The following components were stirred for mixing, to prepare fine particle dispersion.

| | |
|---|---|
| Fine particles {AEROSIL R972V (manufactured by Nippon Aerosil Co., Ltd.)} | 11 parts by mass |
| Ethanol | 89 parts by mass |

Preparation of Fine Particle-Containing Solution

Cellulose acylate was put into a melting tank containing methylene chloride and was heated to be completely melted. The resulting product was filtered through a filter paper No. 244 (manufactured by AZUMI FILTERPAPER CO., LTD). The fine particle dispersion was slowly added to the filtered solution of cellulose acylate while the filtered solution was sufficiently stirred. The solution was dispersed with an attritor. The resulting product was filtered through FINE MET NF (manufactured by Nippon Seisen Co., Ltd.) to prepare a fine particle-containing solution. The amounts of materials used were as follows:

| | |
|---|---|
| Methylene chloride | 99 parts by mass |
| Cellulose acylate (see Table 2) | 4 parts by mass |
| Fine particle dispersion | 11 parts by mass |

Preparation of Main Dope Solution

A main dope solution having a composition described below was prepared. Methylene chloride and ethanol were put into a pressurized melting tank. Cellulose acylate was put with stirring into the pressurized melting tank containing the solvent. The solution was heated with stirring to be completely dissolved. Plasticizers listed below were then added and dissolved. The resulting product was filtered through a filter paper No. 244 (manufactured by AZUMI FILTERPAPER CO., LTD) to prepare a main dope solution.

Composition of Main Dope Solution

| Methylene chloride | 300 parts by mass |
| Ethanol | 30 parts by mass |
| Cellulose acylate (see Table 2 for substitution degree) | 100 parts by mass |
| Polycondensed ester plasticizer E-4 | 3.0 parts by mass |
| Carbohydrate Plasticizer Sucrose octabenzoate | 6.0 parts by mass |

The main dope solution (100 parts by mass) and the fine particle-containing solution (2 parts by mass) were sufficiently mixed with an in-line mixer (Static In-tube Mixer Hi-Mixer SVII manufactured by Toray Engineering Co., Ltd.) to prepare a dope. The dope was uniformly cast onto a support of a stainless steel band having a width of 2 m in a belt casting apparatus. The solvent was evaporated on the support of the stainless steel band up to 40% solvent residue, and the resulting product was separated from the support of the stainless steel band. The two sides of the web were gripped with a tenter, and the web was stretched in the width direction (TD) by 30% under the conditions of 15 mass % solvent residue at the start of the stretching and a temperature of 130 to 140° C. The product was transported through a third drying zone at 125° C. for 30 minutes for drying to yield a cellulose acylate film having a width of 1.5 m, a knurling with a width of 1 cm and a height of 8 μm at its end, and a thickness shown in Table 2. The cellulose acylate film was used as a retardation film.

TABLE 2

| Retardation film | A |
|---|---|
| Ac substitution degree | 1.8 |
| Pr substitution degree | 0.6 |
| Total substitution degree | 2.4 |
| TD drawing ratio (%) | 30 |
| Designed film thickness (μm) | 40 |
| Re (nm) | 40 |
| Rth (nm) | 121 |

Production of Protective Film 1

The following compositions were put into a mixing tank and stirred for dissolution while being heated to prepare a dope.

Composition of Dope

| Cellulose triacetate (substitution degree: 2.85 and Mn = 66,000) | 100 parts by mass |
| Triphenyl phosphate | 6.8 parts by mass |
| Biphenyl diphenyl phosphate | 4.9 parts by mass |
| TINUVIN 326 (manufactured by BASF Japan Ltd.) | 0.24 parts by mass |
| TINUVIN 328 (manufactured by BASF Japan Ltd.) | 0.98 parts by mass |
| Silica particles (average particle diameter: 16 nm, aerosil R972 manufactured by Nippon Aerosil Co., Ltd.) | 0.14 parts by mass |
| Methylene chloride | 414.8 parts by mass |
| Methanol | 62.0 parts by mass |

The prepared dope was uniformly cast from a casting die onto an endless band (casting support) of stainless steel with a band cast die.

The solvent of the dope was evaporated up to 40 mass %, and the dope in the form of a polymer film was separated from the casting support. The film was dried in a drying zone at 110° C. The edges of the film were cut to yield a film having a width of 2000 mm.

Residual solvent was less than 0.1 mass %.

The film had an elastic modulus of 4.4 GPa in the MD.

Production of Protective Film 2

The protective film 1 was stretched by 45% at 185° C. in the MD to produce a film having an elastic modulus of 5.3 GPa in the MD.

Production of Polarizer

Polarizer 1

A polyvinyl alcohol film (degree of polymerization: 2400, degree of saponification: 99.9%) was stretched 6.5 times in a mixed solution of iodine and potassium iodide in the longitudinal direction (MD). The film was then relaxed to 6.0 times to produce a polarizer. The film was cross-linked while being stretched in an aqueous solution of 4% boric acid to yield a polarizer. The transmittance of the polarizer alone was 43.5% or higher. The polarizer had a degree of polarization of 99.6% or higher and a thickness of 25 μm.

Polarizer 2

A polyvinyl alcohol film (degree of polymerization: 2400, degree of saponification: 99.9%) was dyed in a mixed liquid of iodine and potassium iodide. The film was then stretched 6.0 times in an aqueous solution of boric acid as a primary component and glyoxal in the longitudinal direction (MD) to yield a polarizer. The boric acid and glyoxal in the aqueous solution was mixed in a weight ratio of 7:3 while the aqueous solution was held at pH 4 (acidic). The transmittance of the polarizer alone was 43.5% or higher. The polarizer had a degree of polarization of 99.6% or higher and a thickness of 18 μm.

Measurement of Dimensional Change

Since the absorption axis of the polarizing plate was parallel to the MD, a percent difference $\Delta\epsilon'_{abs}$ abs in dimensional change in the MD between the entire polarizing plate and the retardation film alone was determined. More specifically, the percent difference $\Delta\epsilon'_{abs}$ was determined as follows:

A cut sample having a rectangular shape of 30 mm and 120 mm in the MD was left to stand at 25° C. and 60% RH for 2 weeks. Holes having a diameter of 6 mm were formed at the both ends of the sample at intervals of 100 mm, and the original sizes (L1) of the intervals were measured with an automatic pin gauge set (manufactured by Shinto Scientific Co., Ltd.) at the minimum scale of 1/1000 mm. The sample was then dried at 60° C. for 100 hours, and the sizes of the intervals (L2) between the holes were measured at 25° C. and 60% RH. The percentage of dimensional change was determined from the expression $\{(L1-L2)/L1\}\times 100$.

Measurement of Tensile Modulus

Since the absorption axis of the polarizing plate was parallel to the MD, the protective film and the retardation film were subjected to the following measurement in the MD to determine $PE_{abs}$ and $RE_{abs}$. A sample having a rectangular shape of 10 mm by 138 mm was subjected to a tensile measurement using a Compact Table-Top Universal Tester EZ Test/CE (manufactured by SHIMADZU CORPORATION) at 25° C. and 60% RH. Evaluation of light leaks from the periphery of the display flame at the originally black display time Two polarizing plates were attached to the upper and lower sides of each of TN-type liquid crystal cells to form a liquid crystal panel. The brightness of the liquid crystal panels lightning in a black display mode was measured at 25° C. and 60% RH in front view. The liquid crystal panels were dried at 60° C. for 100 hours, and the brightness thereof was measured at 25° C. and 60% RH as in the measurement of the brightness of the initial liquid crystal panels.

Differences in the in-plane maximum brightness between the initial liquid crystal panels and the dried liquid crystal panels were used for evaluation. Evaluation criteria were determined as follows on the basis of the results of sensory evaluation.

TABLE 3

| Evaluation | Difference in maximum brightness (cd/m$^2$) | Visibility (sensory evaluation) |
|---|---|---|
| Excellent | less than 0.15 | substantially invisible |
| Good | 0.15 to 0.3 | slightly visible, but negligible |
| Acceptable | 0.3 to 0.6 | Mildly visible within acceptable range |
| Poor | more than 0.6 | uncomfortably visible |

TABLE 4

| Evaluated items | Example 1 | Example 2 | Example 3 | Comparative Example 1 |
|---|---|---|---|---|
| Difference in dimensional change between polarizing plate and retardation film $|\Delta\epsilon'_{abs}|$ (%) | 0.07 | 0.05 | 0.03 | 0.16 |
| Protective film | 1 | 2 | 2 | 1 |
| Tensile modulus of protective film (GPa) | 4.4 | 5.3 | 5.3 | 4.4 |
| Retardation film or protective film | A | A | A | 1 |
| Tensile modulus of retardation film (GPa) | 3.1 | 3.1 | 3.1 | 4.4 |
| Polarizer | 1 | 1 | 2 | 1 |
| Thickness of polarizer (μm) | 25 | 25 | 18 | 25 |
| Thickness of protective film (μm) | 40 | 40 | 40 | 40 |
| Thickness of retardation film (μm) | 40 | 40 | 40 | 40 |
| light leaks from the periphery of the display flame at the originally black display time | Acceptable | Good | Excellent | Poor |

The results shown in Table 4 demonstrate that a $\Delta\epsilon'_{abs}$ of 0.10% or less leaded to a remarkable reduction in the occurrence of the light leaks from the periphery of the display flame at the originally black display time.

The present disclosure relates to the subject matter contained in Japanese Patent Application No. 159756/2011 filed on Jul. 21, 2011, which is expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A polarizing plate comprising a polarizer, a protective film on a side of the polarizer and a retardation film on the other side of the polarizer;

wherein the polarizer has an absorption axis at 45° from any one of the long and short sides of the polarizing plate, wherein the retardation film has an in-plane slow axis parallel or orthogonal to the absorption axis of the polarizer, wherein a difference $\Delta\epsilon'_{abs}$ in a dimensional change between the polarizing plate and the retardation film in the absorption axis direction of the polarizer satisfies the formula:

$$|\Delta\epsilon'_{abs}| \leq 0.10\%,$$

where $\Delta\epsilon'_{abs}$ (%) is a percent difference in dimensional change in the absorption axis direction at 25° C. and 60% RH between a percent change $Pol\Delta\epsilon_{abs}$ (%) of the length of the polarizing plate after being dried at 60° C. for 100 hours to the initial length of the polarizing plate and a percent change $Ret\Delta\epsilon_{abs}$ (%) of the length of the retardation film after being dried at 60° C. for 100 hours to the initial length of the retardation film alone, wherein a tensile modulus $PE_{abs}$ of the protective film in the absorption axis direction of the polarizer satisfies the formula:

$$PE_{abs} \geq 4.0 \text{ GPa, and}$$

wherein a tensile modulus $RE_{abs}$ of the retardation film in the absorption axis direction of the polarizer satisfies the formula:

$$RE_{abs} \leq 3.8 \text{ GPa.}$$

2. The polarizing plate according to claim 1, wherein the polarizer has a thickness of 30 μm or less.

3. The polarizing plate according to claim 2, wherein the retardation film comprises cellulose acylate having an acetyl group and an acyl group other than the acetyl group.

4. The polarizing plate according to claim 3, wherein the retardation film comprises at least one plasticizer selected from the group consisting of a polycondensed ester plasticizer and a carbohydrate plasticizer.

5. The polarizing plate according to claim 2, wherein the retardation film comprises at least one plasticizer selected from the group consisting of a polycondensed ester plasticizer and a carbohydrate plasticizer.

6. The polarizing plate according to claim 1, wherein the retardation film comprises cellulose acylate having an acetyl group and an acyl group other than the acetyl group.

7. The polarizing plate according to claim 6, wherein the retardation film comprises at least one plasticizer selected from the group consisting of a polycondensed ester plasticizer and a carbohydrate plasticizer.

8. The polarizing plate according to claim 1, wherein the retardation film comprises at least one plasticizer selected from the group consisting of a polycondensed ester plasticizer and a carbohydrate plasticizer.

9. A TN-type liquid crystal display comprising the polarizing plate according to claim 1.

10. The TN-type liquid crystal display according to claim 9, wherein the polarizer has a thickness of 30 μm or less.

11. The TN-type liquid crystal display according to claim 9, wherein the retardation film comprises cellulose acylate having an acetyl group and an acyl group other than the acetyl group.

* * * * *